Figure 1:
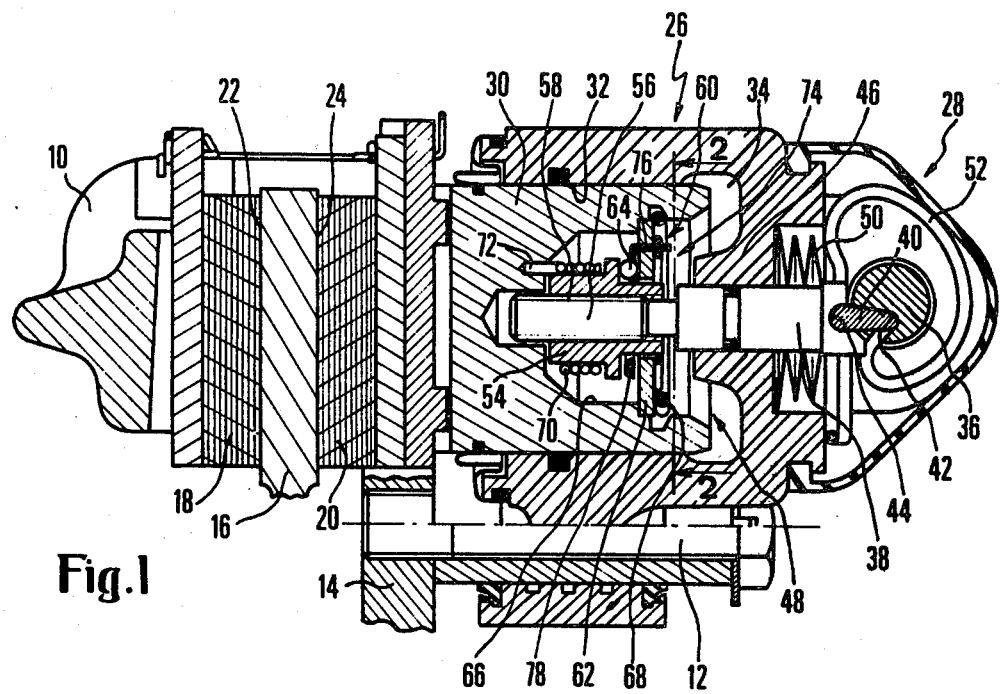

United States Patent [19]

Meyer

[11] 4,167,989

[45] Sep. 18, 1979

[54] SELF ADJUSTING DEVICE FOR A DISC BRAKE

[75] Inventor: Yves Meyer, Taverny, France

[73] Assignee: Societe Anonyme D.B.A., Paris, France

[21] Appl. No.: 890,004

[22] Filed: Mar. 24, 1978

[30] Foreign Application Priority Data

Apr. 1, 1977 [FR] France .............................. 77 09894

[51] Int. Cl.² ............................................ F16D 65/56
[52] U.S. Cl. ............................... 188/71.9; 188/196 D
[58] Field of Search .......... 188/71.9, 79.5 GE, 196 F, 188/196 BA, 196 D

[56] References Cited

U.S. PATENT DOCUMENTS

| | | | |
|---|---|---|---|
| 3,467,228 | 9/1969 | Knights | 188/71.9 X |
| 4,053,031 | 10/1977 | Thioux | 188/71.9 |

FOREIGN PATENT DOCUMENTS 1434369 5/1976 United Kingdom .................... 188/71.9

*Primary Examiner*—Duane A. Reger
*Attorney, Agent, or Firm*—Paul David Schoenle; Ken C. Decker

[57] ABSTRACT

A disc brake including a hydraulic actuator and a mechanical actuator is disclosed. The hydraulic actuator comprises a piston and the mechanical actuator comprises a push rod adapted to engage said piston through a self adjusting device, said adjusting device including a nut received on a threaded rod associated to said push rod, a thrust bearing capable to rotate said nut relative to said push rod on movement of said piston in a brake applying direction, and a clutch spring adapted to prevent rotation of the nut in the opposite direction. The thrust bearing comprises a cage which cooperates with the piston through a circumferential lost-motion connection adapted to limit rotation of said nut relative to said threaded rod to a predetermined angle on each hydraulic brake application.

11 Claims, 2 Drawing Figures

U.S. Patent

Sep. 18, 1979

4,167,989

SELF ADJUSTING DEVICE FOR A DISC BRAKE

The invention relates to a self-adjusting device for a brake, clutch or other apparatus comprising friction members requiring regular adjustment and to a disc brake incorporating such an adjusting device.

More particularly, the invention relates to a self-adjusting device adapted to increae automatically a distance between two relatively movable portions of an apparatus comprising friction members, said device comprising a pair of relatively rotatable elements defining an extensible member, a first of said elements being associated with and prevented from rotating relative to a first portion of the apparatus, operating means interconnecting the second portion of the apparatus and the second element and adapted to rotate the latter in a direction corresponding to lengthening of the extensible member on operation of the apparatus, and one-way coupling means provided between the second portion of the apparatus and the second element to prevent rotation of the latter in the opposite direction.

Adjusting devices of this type are designed to increase automatically the distance separating two portions of a disc brake, drum brake of clutch on operation of the latter, in order to take up the wear on the friction members which effect braking or transmit torque.

In a disc or drum brake, the two portions of the brake which need this adjustment may be a piston and a cylinder receiving this piston, two pistons arranged back to back, or a piston and an associated operating member which operates the brake mechanically. In addition, an operating clearance is generally provided inside the adjusting device to compensate at least for the deformation of the brake under stress, and so to prevent over-adjustment which might generate residual torque when the brake is not operating. Whereas, however, the maximum stress which can be applied to the brake is not always very high and the risk of over-adjustment may be removed by means of a reduced operating clearance, the maximum stress applicable to certain brakes is much higher and would demand a very large operating clearance. One example of such a difference between the stresses which can be applied to the brakes is found in the front and rear brakes of a motor vehicle equipped with a braking proportioning valve which limits the pressure supplied to the rear brakes. In this case, of course, the pressure supplied to the front brakes may be much higher than that supplied to the rear brakes, so that the operating clearance for the front brakes would have to be much greater than the operating clearance for the rear brakes.

However, it is clearly desirable to limit the operating clearance within the self-adjusting device to relatively low values, and one of the objects of the invention is to permit such limitation of the operating clearance whereas eliminating the risk of over-adjustment which generally results from a reduction in the operating clearance.

To this end, the invention proposes a self-adjusting device of the type defined above, characterized in that the adjusting device further comprises adjustment limiting means adapted to limit rotation of the second element to a predetermined angle on each operation of the apparatus.

According to another feature of the invention the operating means comprise at least one abutment member associated with the second portion of the apparatus and cooperating with the second element through a thrust bearing including a cage, said elements cooperating by way of a reversible thread, said adjustment limiting means being inserted between the cage and the abutment member.

According to a further feature of the invention, the adjustment limiting means may comprise a circumferential connection with play between the cage and the abutment member, the play permitted by this connection defining the said predetermined angle.

The invention also relates to a disc brake comprising hydraulic and mechanical operating means capable of separately urging at least one friction element into engagement with a friction surface on a rotary disc, the hydraulic operating means comprising at least one piston received in a cylinder so as to define a variable-volume chamber adapted to be connected to a pressure fluid source, and the mechanical operating means comprising an operating member traversing the wall of the cylinder so as to engage the piston, a self-adjusting device embodying the invention being inserted between the operating member and the piston, which thus constitute the said first and second portions.

Figure 2:
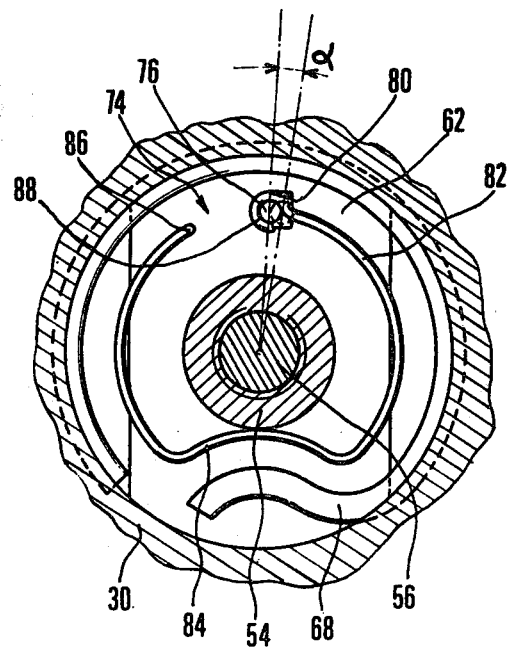

A particular embodiment of the invention will now be described, by way of example, with reference to the accompanying drawings, in which:

FIG. 1 represents a cross-section through a disc brake with combined hydraulic and mechanical controls comprising a self-adjusting device embodying the invention; and FIG. 2 represents a section along a line 2—2 in FIG. 1, on a larger scale.

The disc brake illustrated in FIG. 1 comprises a caliper 10 slidable by way of mounting pins 12, only one of which is shown, on a fixed support 14 associated with a fixed element, for example a stub axle (not shown) in the vehicle. The caliper 10 straddles a rotary disc 16 associated with a rotating part of the vehicle and slidably supports two friction elements 18, 20 which anchor on the caliper. The friction elements are placed opposite respective friction surfaces 22, 24 of the disc 16. Hydraulic operating means generally designated 26 and mechanical operating means designated 28 are associated with the caliper 10 and arranged so as to urge the friction element 20 directly into engagement with the friction surface 24 of the disc 16 and to urge the friction element 18, due to sliding of the caliper 10 along the mounting pins 12, into engagement with the friction surface 22 of the disc 16, so operating the brake.

The hydraulic operating means 26 comprises a piston 30 slidable in a blind cylinder 32 so as to define a variable-volume chamber 31 connectable to a pressure fluid source such as, for example, the master cylinder of the vehicle (not shown).

The mechanical operating means 28 comprise a rotating shaft 36 which can be connected to an operating lever (not shown). Rotation of shaft 36 controls translatory motion of an operating member 38 by means of a transmission element 40 received in recesses 42, 44 formed in the shaft 36 and in the member 38. The operating member 38 is in the form of a pushrod which traverses the base 46 of the cylinder 32 in a fluid-tight manner in order to engage the piston 30 by way of a self-adjusting device generally designated 48. A spring 50, consisting in this embodiment of a stack of Belleville washers, normally urges the operating member 38 into its idle position. In addition a wire spring 52, bearing on the end of the cylinder 32, urges the shaft 36 into its idle position while preventing the force transmission element 40 from escaping.

The self-adjusting device 48 is designed to increase automatically the distance between the two portions of the brake constituted by the piston 30 and by the operating member 38 on operation of the hydraulic operating means 26. The adjusting device 48 comprises an extensible member consisting of two elements 54, 56 of which relative rotation in one direction causes lengthening of the member. The element 54 is a nut, whereas the element 56 is a threaded rod integral with the operating member 38. The elements 54, 56 cooperate by means of a reversible thread 58. The self-adjusting device 48 also comprises operating means generally designated 60 and associated with the piston 30. The operating means 60 comprises an abutment member formed by a washer 62 capable of exerting thrust on the nut 54 by way of a ball thrust bearing 64 on operation of the hydraulic operating means 26. The abutment washer 62 is installed in the larger-diameter portion of a stepped bore 66 in the piston 30 and is kept abutting on the shoulder in this bore 66 by a circlip 68. The self-adjusting device 48 also comprises one-way coupling means comprising a helical friction spring 70 with contiguous coils placed between the piston 30 and the nut 54. As best shown in FIG. 1, the spring 70 is wound on to a cylindrical portion of the nut 54 and has a bent end 74 which enters a corresponding hole in the piston 30, so locking this end 72 of the spring 70 relative to the piston 30, which in turn is prevented from rotating by, for example, studs projecting from the pad 20 into a groove in the outer end of the piston 30.

As will be seen below, the direction in which the spring 70 is wound is such that it allows the nut 54 to turn on the threaded rod 56 in the direction corresponding to lengthening of the extensible member formed by these two elements, that is, to the left in FIG. 1, whereas it prevents the nut 54 from turning in the opposite direction. In accordance with the invention, the adjusting device 48 also comprises adjustment limiting means 74 generally designated 74, adapted to limit the rotation of the nut 54 on the threaded rod 56 to a predetermined angle $\alpha$ on operation of the hydraulic operating means 26.

In the embodiment illustrated, these adjustment limiting means 74 comprise a rod 76 which extends substantially parallel to the axis of the piston 30 from the cage 78 of the ball thrust bearing 64 into an oblong circumferential aperture 80 in the abutment washer 62, so as to define a circumferential connection with play between the cage 78 and the abutment washer 62. In addition, a wire spring 82 is inserted between the rod 76 and the abutment washer 62 to urge both the latter into a predetermined relative position in which the rod 76 engages one of the circumferential edges of the aperture 80 when the hydraulic operating means 26 are released. The spring 82 is substantially circular and has in its intermediate portion a part 84 bent radially inwards to engage the nut 54. In addition, one end 86 of the spring 82 is bent substantially parallel to the axis of the piston 30 into a hole in the abutment washer 62, so locking this end 86 relative to the washer 62, whereas the other end 88 of the spring 82 forms a loop which embraces the rod 76.

The disc brake just described operates as follows:

On actuation of the hydraulic operating means 26, pressure fluid from the master cylinder of the vehicle is introduced into the variable-volume chamber 34, urging the piston 30 to the left in FIG. 1 and so bringing the friction element 20 into engagement with the friction surface 24 of the disc 16. By reaction, the caliper 10 slides along the mounting pins 12 and brings the friction element 18 into engagement with the friction surface 22 of the disc 16. During this movement, the operating member 38 is housed in its idle position by the spring 50, so that relative motion occurs between the piston 30 and operating member 38. When the operating clearance (not shown) which is generally provided inside the self-adjusting device (for example between the washer 62 and thrust bearing 64) is taken up, the abutment washer 62 urges the nut 54 to the left by way of the ball thrust bearing 64. As a result, owing to the reversible nature of the thread 58 and to the direction in which the spring 70 is wound, the nut 54 turns on the threaded rod 56 in the direction corresponding to lengthening of the extensible member formed by these two elements, that is, clockwise in FIG. 2. When the stroke of the piston 30 required to operate the brake is such that rotation of the nut 54 on the threaded rod 56 corresponds to rotation of the cage 78 through the angle $\alpha$ or less, the adjustment of the brake is not limited, and release of the hydraulic pressure in the variable volume chamber 34 causes the piston 30 to return to a new idle position defined by the rotation of the nut 54 on the threaded rod 56 during the previous operation of the hydraulic operating means 26. Simultaneously, the spring 82 returns the rod 76 to the position shown in FIG. 2 without causing the nut 54 to rotate, since the direction in which the spring 70 is wound prevents rotation of the nut 54 in this direction. The net result, therefore, is that the nut 54 turns on the threaded rod 56 through an angle less than or equal to twice the angle $\alpha$ to which corresponds lengthening of the extensible member formed by the nut 54 and rod 56, so defining a new idle position for the piston 30.

If operation of the hydraulic operating means 26 produces motion of the piston 30 such that the rotation of the nut 54 would correspond to rotation of the cage 78 through an angle greater than the angle $\alpha$, the rod 76 engages the circumferential edge of the aperture 80 opposite the edge with which it normally cooperates when idle, so that any further relative rotation of the rod 76 and abutment washer 62 is impossible. Therefore, the rotation of the nut 54 is limited to a value corresponding to rotation of the cage 78 of the ball thrust bearing 64 through the angle $\alpha$. In this way, of course, all risk of over-adjustment of the brake is eliminated, since the maximum adjustment permitted by the adjustment limiting means 74 associated with the automatic adjusting device 48 is restricted to a well-defined value which can be selected according to the particular characteristics of the brake. When the brake pressure in the variable volume chamber 34 is relieved, the various components of the self-adjusting device 48 behave the same way as when the rotation of the rod 76 relative to the abutment washer 62 is less than or equal to the angle $\alpha$.

On operation of the mechanical operating means 28, which are usually connected to a handbrake control in the vehicle, the shaft 36 is rotated clockwise in FIG. 1 by an operating lever (not shown), so that it urges the operating member 38 to the left by way of the force transmission element 40. This movement of the member 38 tends to rotate the nut 54 on the threaded rod 56 in the direction corresponding to an increase in the frictional force applied between the nut 54 and spring 70. The spring 70 therefore prevents the nut 54 from turning, so that the latter transmits all the translatory motion from the member 38 to the piston 30. The friction element 20 is thereby urged directly into engagement with the friction surface 24 of the disc 16, and due to sliding of the caliper along the mounting pins 12 the friction element 18 is urged into engagement with the friction surface 22 on the disc 16, so operating the brake mechanically. When the brake is released the springs 52, 50 respectively urge the shaft 36 and operating member 38 into their idle positions, so that the various components of the brake resume the positions which they occupied before mechanical operation of the brake.

Since the invention relates primarily to a self-adjusting device, it is not restricted to the embodiment described by way of example, but may equally well be applied to any apparatus such as a drum brake or clutch in which it is necessary to compensate automatically for the wear on friction members.

Furthermore, and although the invention also relates to a disc brake incorporating a self-adjusting device of this kind, it will be appreciated that the invention is not restricted to the disc brake described by way of example. In another embodiment (not shown) the disc brake has solely hydraulic operating means, and the adjusting device is therefore inserted between the piston and the base of the cylinder, which is associated with a threaded rod similar to the rod 56. In a further embodiment of the invention, the disc brake comprises hydraulic operating means consisting of two pistons arranged back to back and urging two friction elements similar to the elements 18, 20 on to a rotary disc directly and by reaction by way of a caliper or movable frame. In this case, the adjusting device is inserted between the pistons, a threaded rod similar to the rod 56 being associated with one of the pistons.

What we claim is:

1. A self-adjusting device adapted to increase automatically a distance between two relatively movable portions of an apparatus comprising friction members, said device comprising a pair of relatively rotatable elements defining an extensible member, a first of said elements being associated with and prevented from rotating relative to a first portion of the apparatus, operating means interconnecting the second portion of the apparatus and the second element and adapted to rotate the latter in a direction corresponding to lengthening of the extensible member on operation of the apparatus, and one-way coupling means provided between the second portion of the apparatus and the second element to prevent rotation of the latter in the opposite direction, wherein said device further comprises adjustment limiting means adapted to limit rotation of the second element to a constant predetermined angle on each operation of the apparatus.

2. A self-adjusting device according to claim 1, wherein said operating means comprise at least one abutment member associated with the second portion of the apparatus and cooperating with the second element through a thrust bearing including a cage, said elements cooperating by way of a reversible thread, said adjustment limiting means being inserted between the cage and the abutment member.

3. A self-adjusting device according to claim 2, wherein the adjustment limiting means comprise a circumferential connection with play between the cage and the abutment member, and the play permitted by this connection defining the said constant predetermined angle.

4. A self-adjusting device adapted to increase automatically a distance between two relatively movable portions of an apparatus comprising friction members, said device comprising a pair of relatively rotatable elements defining an extensible member, a first of said elements being associated with and prevented from rotating relative to a first portion of the apparatus, operating means interconnecting the second portion of the apparatus and the second element and adapted to rotate the latter in a direction corresponding to lengthening of the extensible member on operation of the apparatus, and one-way coupling means provided between the second portion of the apparatus and the second element to prevent rotation of the latter in the opposite direction, wherein said device further comprises adjustment limiting means adapted to limit rotation of the second element to a predetermined angle on each operation of the apparatus, said operating means comprising at least one abutment member associated with the second portion of the apparatus and cooperating with the second element through a thrust bearing including a cage, said elements cooperating by way of a reversible thread, said adjustment limiting means being inserted between the cage and the abutment member, said adjustment limiting means comprising a circumferential connection with play between the cage and the abutment member, and the play permitted by this connection defining the said predetermined angle, and at least one rod associated with the cage and received in a circumferential aperture in the abutment member to define said circumferential connection with play.

5. A self-adjusting device as claimed in claim 2, wherein resilient means cooperate with the cage and the abutment member in order to urge the cage into a predetermined angular position relative to the abutment member when the apparatus is not operating.

6. A self-adjusting device adapted to increase automatically a distance between two relatively movable portions of an apparatus comprising friction members, said device comprising a pair of relatively rotatable elements defining an extensible member, a first of said elements being associated with and prevented from rotating relative to a first portion of the apparatus, operating means interconnecting the second portion of the apparatus and the second element and adapted to rotate the latter in a direction corresponding to lengthening of the extensible member on operation of the apparatus, and one-way coupling means provided between the second portion of the apparatus and the second element to prevent rotation of the latter in the opposite direction, wherein said device further comprises adjustment limiting means adapted to limit rotation of the second element to a predetermined angle on each operation of the apparatus, said operating means comprising at least one abutment member associated with the second portion of the apparatus and cooperating with the second element through a thrust bearing including a cage, said elements cooperating by way of a reversible thread, said adjustment limiting means being inserted between the cage and the abutment member, resilient means inserted between the cage and the abutment member in order to urge the latter components into a predetermined relative position when the apparatus is not operating, and the adjustment limiting means comprising at least one rod associated with the cage and received in a circumferential aperture in the abutment member to define a circumferential connection with play between the cage and the abutment member, the play permitted by this connection defining the said predetermined angle, said resilient means comprising a wire spring of which a first end is associated with the abutment member and a second end is associated with the rod so as to urge the latter on to a circumferential edge of the said aperture when the apparatus is not operating.

7. A self-adjusting device as claimed in claim 6, wherein the spring is substantially circular and has in its intermediate portion a part bent radially inwards to engage the second element of the extensible member.

8. A self-adjusting device as claimed in claim 6, wherein the first end of the spring is bent parallel to the axis of the extensible member and enters a hole in the abutment member, the second end of the spring forming a loop which embraces the rod.

9. In a disc brake comprising combined hydraulic and mechanical operating means capable of separately urging at least one friction element into engagement with a friction surface on a rotary disc, said hydraulic operating means comprising at least one piston received in a cylinder so as to define a variable volume chamber adapted to be connected to a pressure fluid source, and said mechanical operating means comprising an operating member traversing a wall of said cylinder to engage said piston, a self-adjusting device comprising:
an extensible member including a pair of relatively rotatable elements, one of said elements being prevented from rotating relative to said operating member,
operating means adapted to control rotation of the other element in a direction corresponding to lengthening of said extensible member on movement of said piston toward said friction surface,
one way coupling means adapted to prevent rotation of said other element in a direction corresponding to shortening of said extensible member, and
adjustment limiting means adapted to limit rotation of said other element to a constant predetermined angle on each rotation of the said other element controlled by said operating means.

10. In a disc brake comprising combined hydraulic and mechanical operating means capable of separately urging at least one friction element into engagement with a friction surface on a rotary disc, said hydraulic operating means comprising at least one piston received in a cylinder so as to define a variable volume chamber adapted to be connected to a pressure fluid source, and said mechanical operating means comprising an operating member traversing a wall of said cylinder to engage said piston, a self-adjusting device comprising:
an extensible member including a pair of relatively rotatable elements, one of said elements being prevented from rotating relative to said operating member;
operating means adapted to control rotation of the other element in a direction corresponding to lengthening of said extensible member on movement of said piston toward said friction surface;
one-way coupling means adapted to prevent rotation of said other element in a direction corresponding to shortening of said extensible member;
adjustment limiting means adapted to limit rotation of said other element to a predetermined angle on each rotation of the said other element controlled by said operating means; and
said operating means comprising thrust bearing means provided between said piston and said other element of the extensible member to transform a movement of said piston toward said friction surface into a rotation of said other element in a direction corresponding to lengthening of said extensible member, said thrust bearing means including a cage member which cooperates with said piston through a circumferential lost-motion connection, said adjustment limiting means comprising said lost-motion connection and resilient means which are provided to urge the cage member in a predetermined position relative to said piston.

11. A self-adjusting device according to claim 10, wherein said resilient means is a substantially circular wire spring of which one end engages said piston and of which the other end engages said cage member, an intermediate portion of said spring cooperating with said other element, whereby said spring is prestressed to urge said cage member in said predetermined position relative to said piston.

* * * * *